US006551057B1

(12) United States Patent
Haaser et al.

(10) Patent No.: US 6,551,057 B1
(45) Date of Patent: Apr. 22, 2003

(54) DAMPED TORQUE SHAFT ASSEMBLY

(75) Inventors: Frederic G. Haaser, Cincinnati; Wayne R. Bowen; William T. Dingwell, both of West Chester; Michael Even-Nur, Cincinnati; James C. Przytulski, Fairfield, all of OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/444,623

(22) Filed: Nov. 22, 1999

(51) Int. Cl.$^7$ .......................... F01D 25/04; F01D 17/12
(52) U.S. Cl. .................... 415/119; 415/149.4; 415/150; 415/160
(58) Field of Search ................. 415/119, 150, 415/160, 159, 149.4, 162

(56) References Cited

U.S. PATENT DOCUMENTS

| | | | |
|---|---|---|---|
| 2,858,062 A | 10/1958 | Allen | 415/150 |
| 2,933,234 A | 4/1960 | Neumann | 415/149.4 |
| 2,933,235 A | 4/1960 | Neumann | 415/149.4 |
| 3,487,992 A | * 1/1970 | Pineda | 415/149.4 |
| 3,779,665 A | * 12/1973 | Tatem, Jr. et al. | 415/15 |
| 4,049,360 A | * 9/1977 | Snell | 415/149.4 |
| 4,720,237 A | 1/1988 | Weiner et al. | 415/150 |
| 4,755,104 A | 7/1988 | Castro et al. | 415/150 |
| 4,890,977 A | 1/1990 | Tremaine et al. | 415/150 |
| 5,281,087 A | 1/1994 | Hines | 415/160 |
| 5,492,446 A | 2/1996 | Hawkins et al. | 415/160 |
| 5,807,072 A | 9/1998 | Payling | 415/160 |
| 5,820,348 A | 10/1998 | Fricke | 416/248 |

FOREIGN PATENT DOCUMENTS

| DE | 1112350 | 8/1961 |
|---|---|---|
| GB | 1499531 | 2/1976 |

OTHER PUBLICATIONS

"LM 2500 Progress Report", GE Marine & Industrial Engines, Jul. 1996, brochure.

"VSV Torque Shaft–13 Background", GE Marine & Industrial AeroDerivative Gas Turbines, LM2500BREAK–OUT.PPT, 6 pgs.

"GE M&IAD Users Conference", GE Marine & Industrial AeroDerivative Gas Turbines, Power Point Presentation, Sep. 27–OCt. 1, 1999.

* cited by examiner

Primary Examiner—Edward Look
Assistant Examiner—Richard Edgar
(74) Attorney, Agent, or Firm—Steven J. Rosen; William Scott Andes

(57) ABSTRACT

A torque shaft assembly includes a hollow tube with a central axis disposed between and fixedly connected to first and second crankshafts at first and second distal ends, respectively, of the tube for movement of an array of connecting members such as push rods. A hollow interior of tube between the first and second crankshafts is filled with a sufficient quantity of flowable inertia material or damping media to absorb vibratory energy by friction during operation of the engine. The hollow interior is preferably filled with a quantity of damping media to a level by volume of about 98% and a preferred flowable inertia material is round steel shot. A plurality of spaced-apart clevises are fixedly attached to a tube wall on an outer surface of the tube wall surrounding the hollow interior. Each clevis includes connection means disposed away from the wall outer surface for connection with an actuator for movement of the array of adjustable devices such as variable stator vanes.

20 Claims, 6 Drawing Sheets

DAMPED TORQUE SHAFT ASSEMBLY

BACKGROUND OF THE INVENTION

This invention relates to torque shaft assemblies for moving an array of adjustable members to rotate variable stator vanes in a gas turbine engine. More particularly, it relates to damped hollow torque shaft assemblies with damping media inside a hollow interior of the shaft.

Gas turbine engines with variable stator vanes (VSV), for example variable compressor stator vanes, frequently include a torque shaft assembly associated with an actuator. Such an assembly enables and coordinates movement of a plurality of stages of stator vanes responsive to controlled, changing engine conditions by way of crank arms connected to a unison ring for varying the angle of the vanes in each stage. A torque shaft is used to actuate the variable stator vane system of the high-pressure compressors on engines such as the General Electric LM2500+ engine. Generally, a torque shaft actuation system is advantageous in providing flexibility in stage to stage (non-linear) VSV scheduling. Examples of gas turbine engines including axial flow compressors having variable stator mechanisms are disclosed in U.S. Pat. Nos. 2,858,062, 2,933,235, and 5,281,087. An example of a torque shaft assembly is disclosed in U.S. Pat. No. 4,890,977.

Currently used torque shaft assemblies include solid metal shafts upon which are provided features such as recesses, slots, indentations, lugs, etc., on the outer surface of the shaft to receive or provide connections with other assembly parts, for example, tumbuckles. Some torque shafts are crank shafts with cranks or shafts fixedly connected to and disposed between two crank arms and the crank arms are rotatable about an axis of rotation. Because torque shafts can be subject to undesirable flexural (flex) action resulting from engine vibration, some gas turbine engine solid shafts have been provided with a generally central mount, in addition to end mounts, to restrict such undesirable motion of the shaft. Torque shaft assemblies that include crank shafts cannot incorporate such a central mount. Torque shaft assemblies having solid crank shafts with only end mounts have been used. It has been found that premature wear has been observed with such end-mounted torque shafts, sometimes in a very short period of time. For example, such wear has occurred on forward shaft journals and on aft spherical bearings. Means to restrict or change the occurrence of undesirable motion of such end-mounted shafts to avoid premature wear would reduce the need for early repair or replacement of torque shafts.

Wear on one form of solid torque shafts in a gas turbine engine torque shaft assembly for an axial flow compressor variable stator vane assembly has been found to occur due to first flex natural frequencies or forced response (due to engine imbalance) of the solid shaft being driven in an engine operating range at high speed. These modes are driven by the inherent one per revolution (1/rev) balance condition of the compressor rotor. A solid shaft first flex frequency for one type of axial flow gas turbine engine crosses the 1/rev line very close to the operating speed of the engine at maximum power. Since this is the speed where the engine spends nearly all of its operating time, the solid shaft becomes excited and the force of its vibration causes relatively rapid wear of the solid shaft and/or its associated members and support bearings.

One technique to avoid this problem is the use of a hollow shaft in the assembly of the present invention, which would appear to move the 1/rev line crossing well above the maximum engine operating speed for that engine. At the same time, the 2/rev crossing of the first flex frequency modes is maintained at or below engine idle speed. A hollow shaft assembly offers flexibility not available with the solid shaft design to operate at higher natural frequencies and to enable tuning of the shaft frequency within the constraints of the engine mounting points and envelope available.

The axis of rotation of the tube can be moved by adjusting the design of the crank arms so that all attachment points to associated actuator assembly members are outside of the tube and away from the hollow shaft surface. This is done to ensure that the integrity and stiffness of the hollow shaft, in this case a tube, was maintained to maximize frequency. This is in contrast with the assembly using the prior art solid shaft in which at least a part of the attachment points are within the outside diameter of the solid shaft, for example, at indentations or portions machined into the solid shaft. This design substantially reduces the shaft's frequency.

An exemplary selected outside diameter and different hollow shaft wall thickness should be evaluated to select a desired frequency for the particular engine design. It is desirable to move the 1/rev crossing as high as possible keeping the 2/rev crossing at or below the engine idle speed, generally as discussed above. However, engine tests has shown that a forced response vibratory level of the hollow shaft is still too high if the engine has high core vibration level comparable to the vibratory level of the self-excited solid torque shaft. Analysis supported by component and engine testing has demonstrated that the natural frequency of the torque shaft depends on bearing clearance and forcing amplitude. Additional factors to be considered in designing the torque shaft assembly include the complexity of engine system vibratory mode and the fact that engine vibratory signature may vary slightly between engines. It is highly desirable to eliminate vibratory excitation of the hollow torque shaft and associated assembly at all operating speeds and under all operating conditions.

BRIEF SUMMARY OF THE INVENTION

The present invention, in one form, provides a torque shaft assembly including a tube with a central axis disposed between and fixedly connected to first and second end shafts at first and second distal ends, respectively, of the tube for movement of an array of adjustable members. A hollow interior of tube having a length between the first and second crankshafts is filled with a sufficient quantity of flowable inertia material or damping media to absorb vibratory energy by friction during operation of the engine. A preferred flowable inertia material is round steel shot. The hollow interior is preferably filled with a quantity of damping media to a level in a range of between 85%–98% by volume and a more preferred level of about 98%. Other types of inertia material suitable for use are particulates or pellets such as sand and small plastic spheres, respectively.

A plurality of spaced-apart devises are fixedly attached to a tube wall on an outer surface of the tube wall surrounding the hollow interior. Each clevis includes connection means disposed away from the wall outer surface for connection with an actuator for movement of the array of adjustable members.

DETAILED DESCRIPTION OF THE INVENTION

Figure 1:
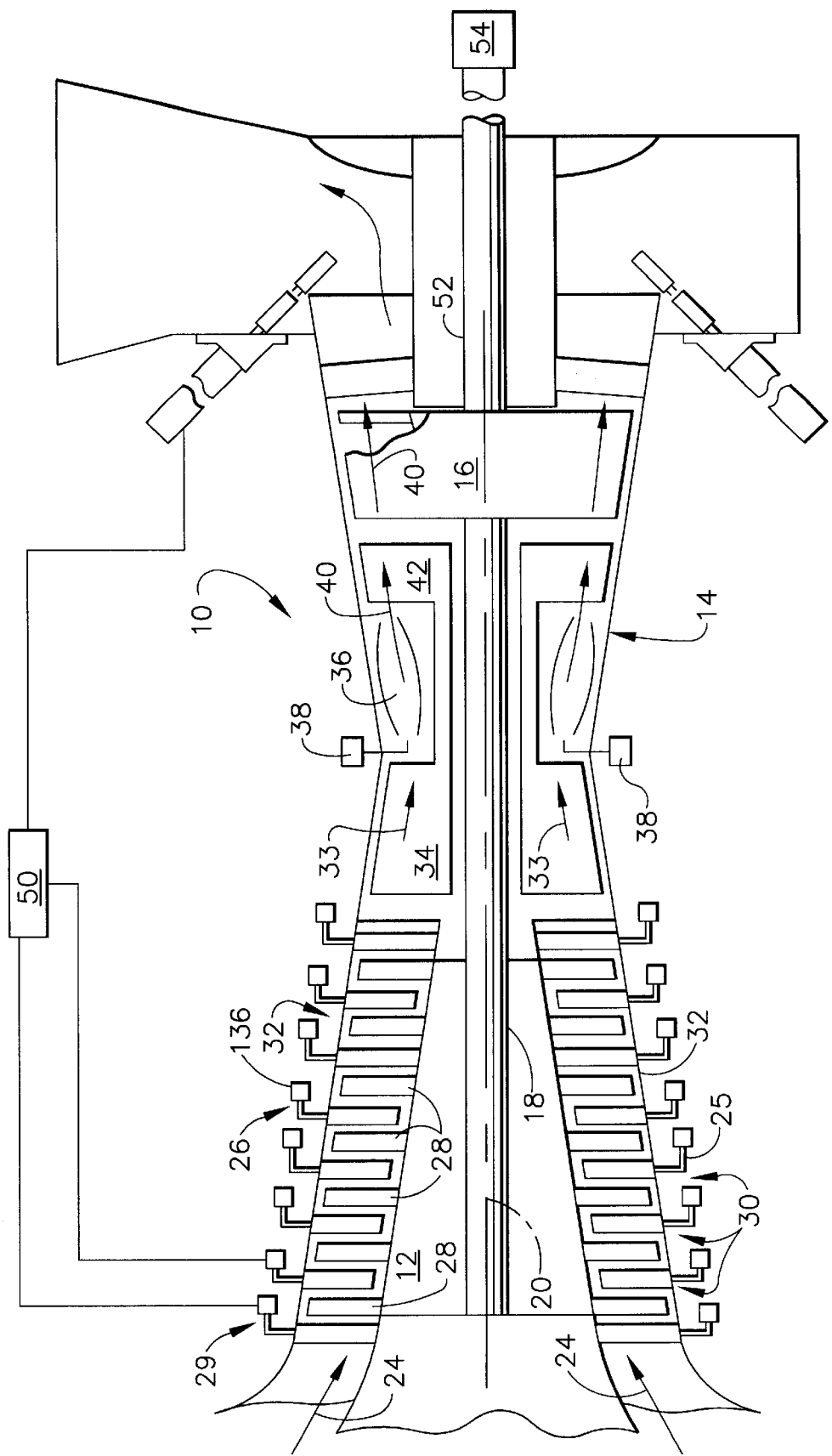
FIG. 1 is a centerline sectional schematic illustration of a gas turbine engine having a damped hollow torque shaft assembly of the present invention.

FIG. 1 illustrates an exemplary gas turbine engine 10, such as the General Electric LM2500+ gas turbine engine, including in serial flow relationship a compressor 12, a core engine 14, and a low-pressure, or power turbine 16 having a first rotor shaft 18 conventionally joined to the compressor 12 for providing power thereto, all disposed coaxially about a longitudinal centerline axis 20. An output shaft 52 from the power turbine 16 is used to drive an electrical generator 54 or some other device. The compressor 12 compresses an inlet airflow 24 to provide a compressed airflow 33 to the core engine 14 having a conventional high-pressure compressor (HPC) 34 which further compresses at least a portion of the compressed airflow 33 and channels it to a combustor 36. Fuel injection means 38 provides fuel to the combustor 36 wherein it is mixed with the compressed airflow for generating combustion gases 40 which are conventionally channeled to a conventional high-pressure turbine (HPT) 42. The HPT 42 is conventionally joined to the HPC 34 by the first rotor shaft 18.

The compressor 12 includes a variable inlet guide vane 29 followed by a plurality of circumferentially spaced rotor blades 28 and variable stator vanes (VSV) 30 disposed in several rows. Illustrated are seven rows of the rotor blades 28 and seven rows of the variable stator vanes 30 surrounded by a compressor casing 32. Stator vanes 30 direct inlet airflow 24 at the desired angle into the rotor blades 28. Variable inlet guide vane 29 and variable stator vanes 30 direct inlet airflow 24 into rotor blades 28 at various angles depending on engine operating conditions to improve compressor stall margin and to improve fuel efficiency of the engine. Stall margin is a conventional parameter, which indicates the margin of operation of the compressor 12 for avoiding undesirable high pressure ratios across the compressor 12 at particular flow rates of the compressed airflow 33 therethrough, which would lead to undesirable stall of the compressor 12. U.S. Pat. No. 5,281,087 is incorporated herein by reference, particularly, as to the construction and operation of an industrial gas turbine engine.

Figure 2:
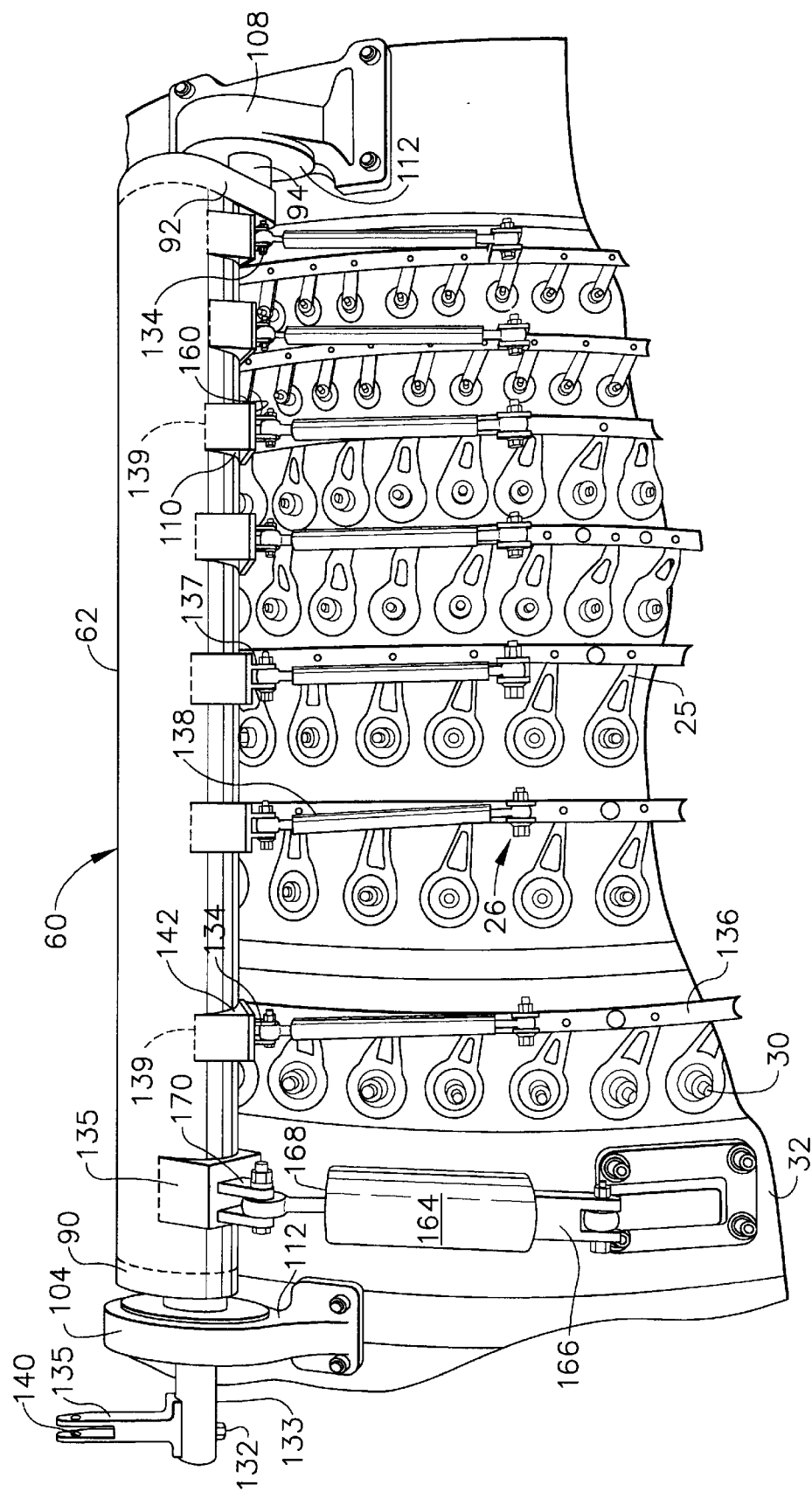
FIG. 2 is a diagrammatic side view illustration of a compressor section of the gas turbine engine with a variable stator vane actuation assembly including the damped hollow torque shaft in FIG. 1.

Further referring to FIG. 2, the variable stator vanes 30 are rotatably mounted to the compressor casing 32 and are actuated by vane crank arms 25 and unison ring assemblies 26 mounted exterior to the compressor casing for varying the angle of the VSV with respect to flow 24. Variable stator vanes 30 and associated actuation devices in an HPC are well known in the field of gas turbine engines as indicated in the references above. An engine control 50, such as a mechanical or digital electronic control, is used to control operation of the engine 10 including the varying of the VSVs 30.

Figure 3:
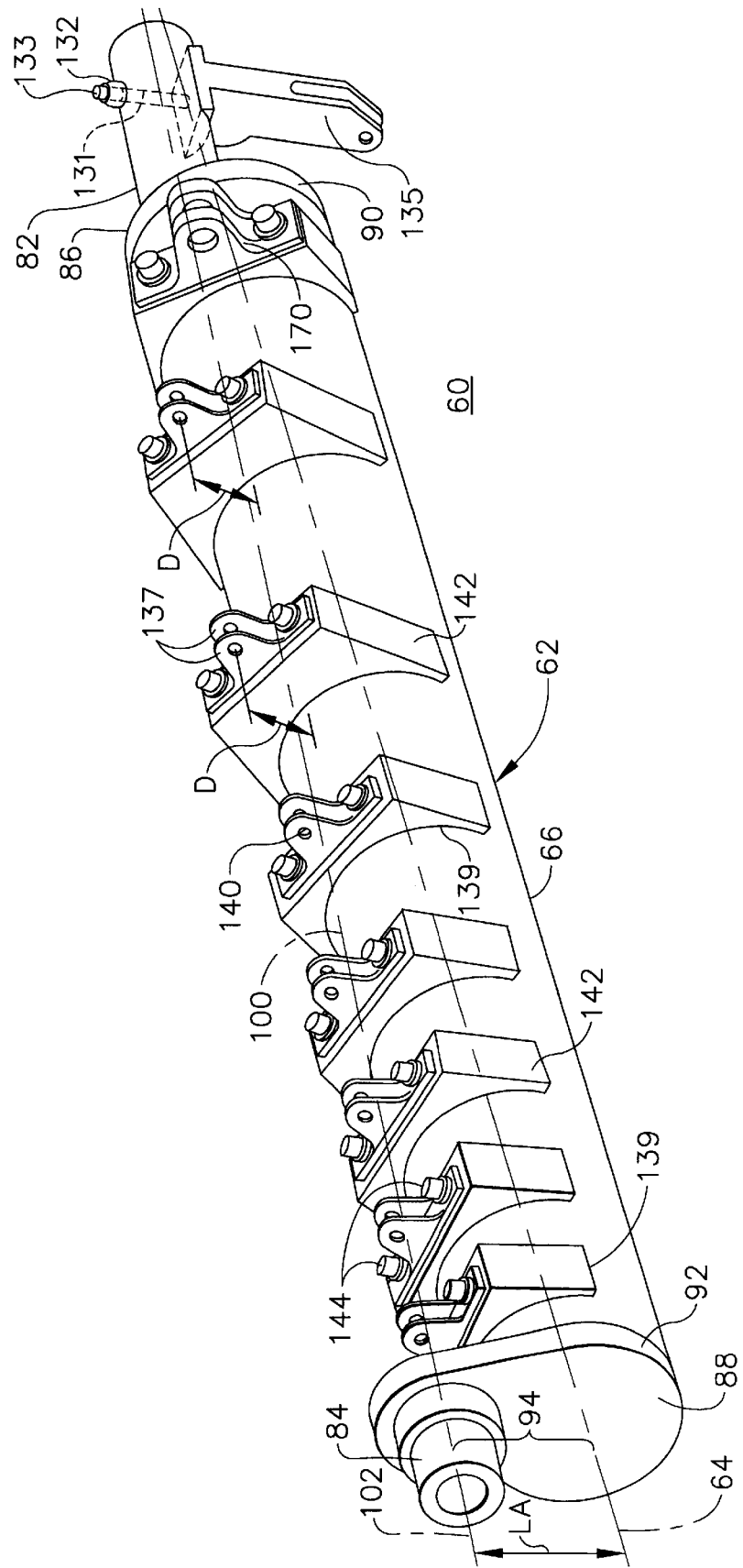
FIG. 3 is a perspective view diagrammatic illustration of the damped hollow torque shaft assembly in FIGS. 1 and 2.
Figure 4:
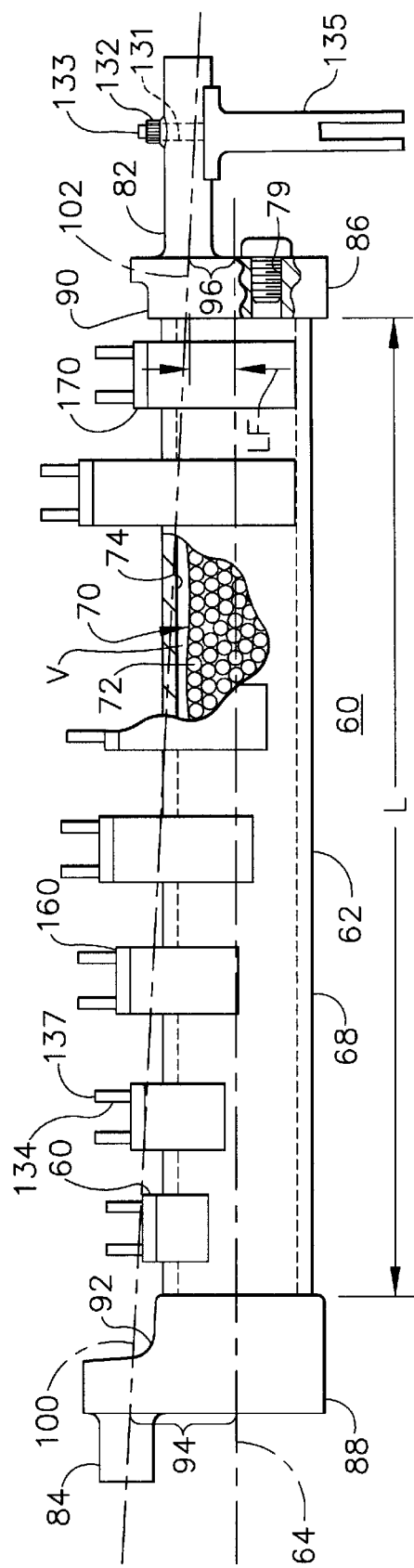
FIG. 4 is a partially cut-a-way side elevational view illustration of the damped hollow torque shaft assembly in FIG. 3.

Illustrated in FIGS. 2, 3, and 4 is an exemplary embodiment of a pivotable damped hollow torque shaft assembly, shown generally at 60 on the compressor casing 32 of the compressor 30 of the engine 10. Though only one damped hollow torque shaft assembly 60 is illustrated, two are typically used, one on each side of the engine or about 180 degrees apart from each other with respect to the longitudinal centerline axis 20. Briefly referring further to FIG. 8, the torque shaft assembly 60 includes a hollow tube 62 illustrated in this example in the form of a metal tube with a substantially continuous tube wall 66 and tube wall outer surface 68, for example, to maintain structural integrity. The tube 62 has a shaft tube axis 64 and a hollow interior 74.

Referring back to FIG. 4, the hollow interior 74 has an axial length L and a volume V and is filled with a sufficient quantity of flowable inertia material or damping media 70 to absorb vibratory energy by friction during operation of the engine 10. One type of the damping media 70 is pellets and preferably round steel shot 72 and the hollow interior is preferably filled to a preferred level of about 98% of the volume V with the steel shot or, alternatively, to a level in a range of between 85%–98% by volume. Other types of inertia material suitable for use are particulates or pellets such as sand and small plastic spheres, respectively. The damping media 70 and, particularly, the round steel shot 72 is highly effective in eliminating vibratory excitation of the hollow torque shaft and associated assembly at all operating speeds and under all operating conditions.

Steel shot 72 or comparable damping media inside the tube 62 produces damping. Extensive testing has shown that the shaft volume V should be approximately 90% full of shot 72 to produce maximum damping effectiveness. This provides the shot 72 with sufficient relative motion to absorb the vibratory energy and, at the same time, insure that the shot is sufficiently packed to produce contact between them at all times to produce adequate friction for maximum damping effectiveness. The shot 72 made from steel having a stainless steel condition and a level of hardness slightly above the level of the tube material (SS321) hardness is preferred. The shot condition and hardness are optimized to minimize deterioration and wear of the shots as well as the tube wall 66. Shot sizes between 0.030–0.090 inch in diameter have been used and do not appear to be critical with respect to damping efficiency. Other types of inertia material suitable for use are particulates or pellets such as sand and small plastic spheres, respectively. The shot is poured into the tube 62 through a plug opening 79 in one of the end caps described below.

Referring again to FIGS. 3 and 4, the torque shaft assembly 60 is a crank shaft with the tube 62 being a single crank disposed fixedly connected to and between spaced-apart solid metal first and second end shafts 82 and 84 fixedly attached to and at respective first and second distal ends 86 and 88 of the tube 62. The first and second end shafts 82 and 84 have substantially circular cross-sections and are fixedly attached to the tube 62 by respective first and second end caps 90 and 92 at the respective first and second distal ends 86 and 88. At least one of the end shafts has a respective shaft axis of rotation that is offset from the tube axis 64. In the exemplary embodiment, both of the first and second end shafts 82 and 84 are co-linear and, thus, define a shaft axis of rotation 100 that is offset from, angled with respect to, and is substantially co-planar with the tube axis 64. The shaft axis of rotation 100 and the tube axis 64 are not parallel.

The aft or the second end shaft 84 is mounted on an aft crank shaft arm 94 that is integrally connected with the second end cap 92 defining an aft crank arm length LA between the shaft axis of rotation 100 and the tube axis 64 at the second end cap. The forward or the first end shaft 82 is mounted directly on the first end cap 90 defining a forward crank arm length LF between the shaft axis of rotation 100 and the tube axis 64 at the first end cap and a portion of the first end cap therebetween which operates as a forward crank shaft arm 96. This arrangement enables the tube 62 to operates as a single crank to be pivoted about the shaft axis of rotation 100 and apply torque and supply power to move associated unison rings 136 through commonly used adjustable length push rods 138 located on the tube wall outer surface 68. The first and second end shafts 82 and 84 are connected to the respective first and second shaft axes of rotation 100 and 102 that are offset from the tube axis 64. This divergence of the shaft axis of rotation 100 and the tube axis 64 enables all of the attachment points of connecting means, such as the devises described below, linking the tube 62 to the associated unison rings 136 through commonly used adjustable length push rods 138, to be located on the tube wall outer surface 68. This ensures that the integrity and stiffness of the tube is maintained in order to maximize frequency. In addition, the amount of offset of the axes can be used to adjust the amount of movement of such associated members, for example, the push rods 138.

Figure 6:
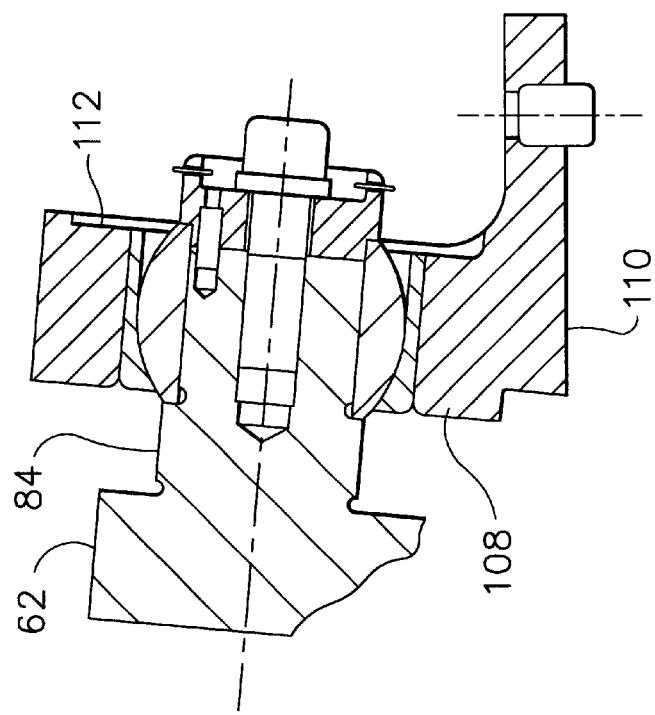
FIG. 6 is a cross-sectional side view illustration of a spherical bearing supporting an aft end shaft of the torque shaft in FIG. 4.
Figure 5:
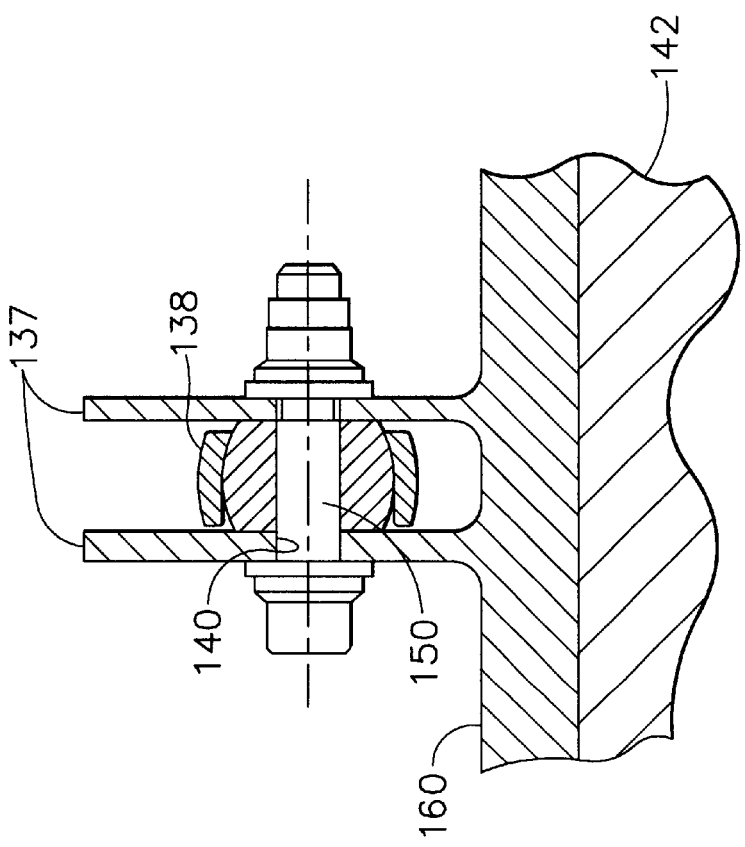
FIG. 5 is a cross-sectional side view illustration of a devis on the damped hollow torque shaft assembly in FIGS. 3 and 4.
Figure 7:
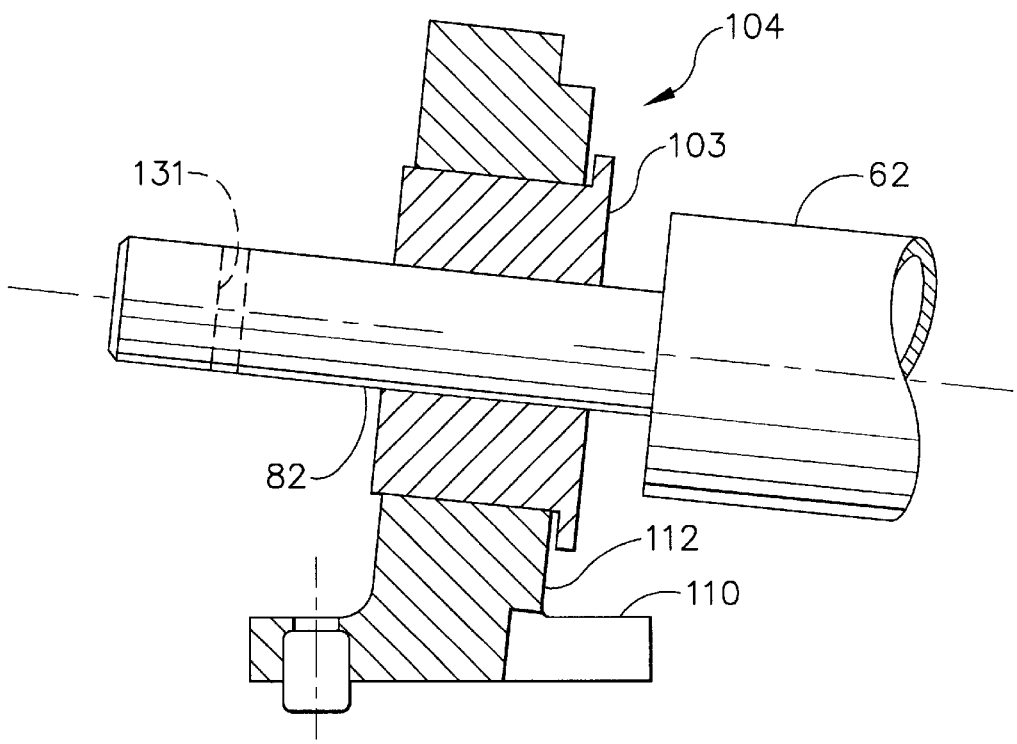
FIG. 7 is a cross-sectional side view illustration of a lined journal bearing supporting a forward end shaft of the torque shaft in FIG. 4.

Referring to FIG. 2, the forward or first end shaft 82 is rotatably supported by a first shaft bearing 104 which is preferably a lined journal bearing type as illustrated with a replaceable liner 103 surrounding the first end shaft 82 more particularly in FIG. 7. The aft or second end shaft 84 is rotatably supported by a second shaft bearing 108 which is preferably a spherical bearing as illustrated more particularly in FIG. 6. The first and second bearings 104 and 108 include bases 110 that are mounted substantially flush on the compressor casing 32, and bearing housings 112 that are positioned and angled with respect to the bases so that the first and second end shafts 82 and 84 which are co-linear and the shaft axis of rotation 100 are offset from, angled with respect to, and substantially co-planar with the tube axis 64.

Figure 8:
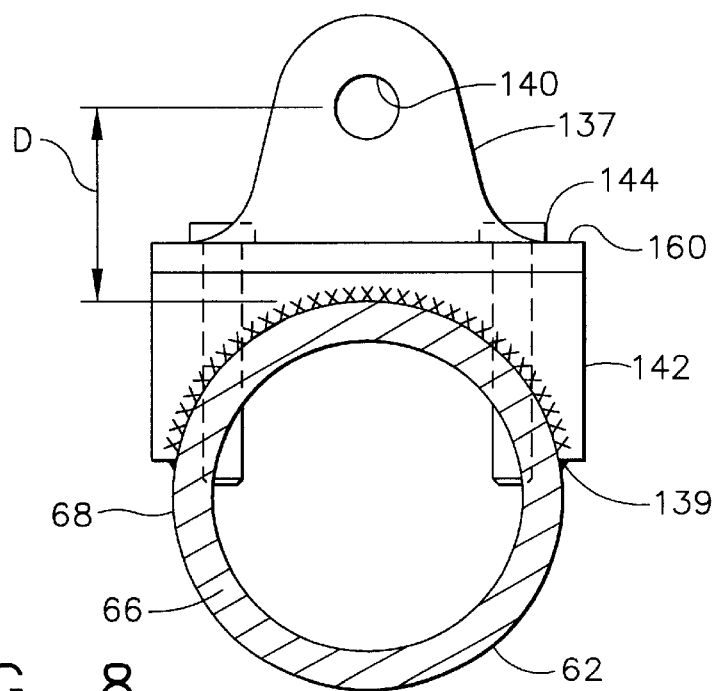
FIG. 8 is a cross-sectional view of a hollow shaft in FIG. 3 showing the clevis mounted on a saddle adapter a tube wall of the damped hollow torque shaft assembly in FIGS. 3 and 4.

Illustrated in FIGS. 2, 3, and 4 is a plurality of spaced-apart metal devises 134 fixedly attached to adapter saddles 142 by screws 144. The adapter saddles 142 are fixedly attached to the tube 62 such that devises 134 are positioned outwardly of the tube wall outer surface 68 at various angular positions around the tube to provide an exemplary connecting means for connecting linkage elements such as the push rods 138. Linkage elements such as the push rods 138 link the actuated devices such as the VSVs to the torque shaft assembly 60 typically by way of the push rod 138 or some other force transmitting structural connecting member or element. Each clevis 134 is attached to a unison ring 136 of one of the unison ring assemblies 26 by the adjustable length push rod 138 sometimes referred to as a turnbuckle. All but one of the devises 134 are positioned at different distances D, as illustrated in FIGS. 3 and 8, away from and outside of the tube wall outer surface 68 as needed for programmed, controlled or coordinated movement of the variable stator vanes 30. The devises 134 are mounted on the adapter saddles 142 which are preferably secured to the tube wall 66 with welds 139 along the tube wall outer surface 68. Such different distances D are provided by varying the size of the adapter saddle 142, shown in more detail in FIGS. 3 and 4. Other joining means, including mechanical attachment such as screws and bolt, bonding, brazing, etc., can be used to secure the devises 134 to the tube wall 66, taking into consideration such factors as the relative coefficient of thermal expansion of the members to be joined to avoid separation or cracking upon thermal cycling. A forwardmost clevis 135 is mounted to a flat on the first end shaft 82. The forwardmost clevis 135 has a threaded shank 133 that passes through an aperture 131 in the first end shaft 82 and is secured to the first end shaft with a nut 132 on the end of the shank.

Referring now more particularly to FIG. 8, in the exemplary embodiment of the invention, the clevis 134 includes a pair of spaced-apart clevis lugs 137 each having a clevis eyelet 140 for receiving a bolt 150 to pivotably connect one of the push rods 138 for actuating the unison ring 136. Use of a fixed shape clevis with a size-variable adapter, such as a saddle, secured with the wall outer surface enables ease of variation or adjustment of the distance D of the clevis from the tube to each unison ring 136 by varying the size of the saddle. Such distance D depends on designed, programmed movement of stages of the array of the variable stator vanes. In addition, use of different size adapter saddles 142 allows manufacture of the hollow shaft assembly of the present invention to replace prior art solid shaft assemblies without change in the design or operation of other, associated members. The clevis 134 has a clevis base 160 secured to the adapter saddle 142 with clevis screws 144.

Referring again to FIG. 2, a hydraulic linear actuator 164 is connected at a first end 166 to the compressor casing 32 and at a second end 168 to one of the devises 134, denoted as actuator clevis 170, for pivoting the tube 62 about the shaft axis of rotation 100 and actuating the unison rings 136 through the push rods 138.

The present invention has been described in connection with specific examples, embodiments, materials, etc. However, it should be understood that they are intended to be representative of, rather than in any way limiting on, its scope. Those skilled in the various arts involved will understand that the invention is capable of variations and modifications without departing from the scope of the appended claims.

What is claimed is:

1. A damped torque shaft assembly for actuating devices on a gas turbine engine comprising:

a hollow tube having a tube wall with a wall outer surface surrounding an enclosed hollow interior and circumscribing a tube axis;

forward and aft crank arms operably connected to said wall and spaced axially apart with respect to said tube axis;

forward and aft shafts fixedly connected to said forward and aft crank arms respectively;

said forward and aft shafts having a shaft axis of rotation about which said tube is pivotable;

a plurality of spaced-apart connecting means for connecting linking elements to the actuated devices, said connecting means secured to said tube wall on said wall outer surface; and said enclosed hollow interior having a volume sufficiently filled with a quantity of damping media to absorb vibratory energy by friction during operation of the engine.

2. A shaft assembly as claimed in claim 1 wherein said quantity of damping media is about 98% of said volume.

3. A shaft assembly as claimed in claim 1 wherein said damping media is steel shot.

4. A shaft assembly as claimed in claim 3 wherein said quantity of damping media is about 98% of said volume.

5. A shaft assembly as claimed in claim 4 wherein said connecting means comprises a plurality of spaced-apart clevises secured to said tube wall on said wall outer surface, each clevis disposed at a distance away from said wall outer surface for connection with an actuator for movement of said adjustable members.

6. A shaft assembly as claimed in claim 5 wherein at least one of said clevises is disposed away from said wall outer surface a distance that is different than distances of other of said clevises.

7. A shaft assembly as claimed in claim 5 further comprising adapter saddles between each of said clevises and said tube wall, said adapter saddles secured to said tube wall on said wall outer surface, and said clevises mounted on said adapter saddles.

8. A shaft assembly as claimed in claim 7 wherein adapter saddles are welded to said tube wall.

9. A shaft assembly as claimed in claim 8 wherein said clevises are attached to said adapter saddles by screws.

10. A shaft assembly as claimed in claim 4 further comprising a spherical bearing means supporting said aft shaft.

11. A shaft assembly as claimed in claim 10 further comprising a lined journal bearing means supporting said forward shaft.

12. A shaft assembly as claimed in claim 11 wherein said connecting means comprises a plurality of spaced-apart clevises secured to said tube wall on said wall outer surface, each clevis disposed at a distance away from said wall outer surface for connection with an actuator and for movement of the devices.

13. A shaft assembly as claimed in claim 12 wherein at least one of said clevises is disposed away from said wall outer surface a distance that is different than distances of other of said clevises.

14. A shaft assembly as claimed in claim 13 further comprising adapter saddles between each of said clevises and said tube wall, said adapter saddles secured to said tube wall on said wall outer surface, and said clevises mounted on said adapter saddles.

15. A shaft assembly as claimed in claim 14 wherein adapter saddles are welded to said tube wall.

16. A shaft assembly as claimed in claim 15 wherein said clevises are attached to said adapter saddles by screws.

17. A shaft assembly as claimed in claim 16 wherein said tube axis and said shaft axis of rotation are not parallel.

18. A shaft assembly as claimed in claim 4 wherein said quantity of damping media is in a range of about between 85%–98% of said volume.

19. A shaft assembly as claimed in claim 18 wherein said connecting means comprises a plurality of spaced-apart clevises secured to said tube wall on said wall outer surface, each clevis disposed at a distance away from said wall outer surface for connection with an actuator and for movement of the devices.

20. A shaft assembly as claimed in claim 19 wherein at least one of said clevises is disposed away from said wall outer surface a distance that is different than distances of other of said clevises.

* * * * *